(12) United States Patent
Khan et al.

(10) Patent No.: US 7,133,892 B2
(45) Date of Patent: Nov. 7, 2006

(54) METHOD AND COMPUTER PROGRAM PRODUCT FOR CUSTOMIZED INFORMATION MANAGEMENT BY ALLOWING A FIRST HABITAT TO ACCESS OTHER HABITATS TO RETRIEVE INFORMATION FROM THE OTHER HABITATS

(75) Inventors: Umair A. Khan, Fremont, CA (US); Wasiq M. Bokhari, Fremont, CA (US); Quinton Zondervan, Boston, MA (US)

(73) Assignee: NVIDIA International, Inc., St. Michael Barbados (KN)

( * ) Notice: Subject to any disclaimer, the term of this patent is extended or adjusted under 35 U.S.C. 154(b) by 681 days.

(21) Appl. No.: 09/905,678

(22) Filed: Jul. 13, 2001

(65) Prior Publication Data

US 2002/0046254 A1 Apr. 18, 2002

Related U.S. Application Data

(63) Continuation-in-part of application No. 09/595,781, filed on Jun. 16, 2000, now Pat. No. 6,438,575.

(60) Provisional application No. 60/283,775, filed on Apr. 12, 2001.

(51) Int. Cl.
*G06F 15/16* (2006.01)

(52) U.S. Cl. .................. 709/203; 709/204; 709/219; 709/246; 707/3; 707/10

(58) Field of Classification Search ................ 709/203, 709/204, 217, 219, 223, 246; 707/3, 10; 715/700
See application file for complete search history.

(56) References Cited

U.S. PATENT DOCUMENTS

| | | | | |
|---|---|---|---|---|
| 5,983,268 A | * | 11/1999 | Freivald et al. | 709/218 |
| 6,192,382 B1 | * | 2/2001 | Lafer et al. | 715/513 |
| 6,405,240 B1 | * | 6/2002 | Tsubone et al. | 709/203 |
| 6,654,032 B1 | * | 11/2003 | Zhu et al. | 345/753 |
| 6,735,586 B1 | * | 5/2004 | Timmons | 707/3 |
| 2001/0016034 A1 | * | 8/2001 | Singh et al. | 379/88.17 |
| 2001/0034734 A1 | | 10/2001 | Whitley et al. | 707/104.1 |
| 2001/0037355 A1 | | 11/2001 | Britt, Jr. | 709/201 |
| 2002/0023230 A1 | | 2/2002 | Bolnick et al. | 713/202 |
| 2002/0032782 A1 | | 3/2002 | Rangan et al. | 709/229 |
| 2002/0065877 A1 | * | 5/2002 | Kowtko et al. | 709/203 |
| 2002/0083148 A1 | * | 6/2002 | Shaw et al. | 709/214 |
| 2002/0123334 A1 | * | 9/2002 | Borger et al. | 455/419 |
| 2002/0130894 A1 | * | 9/2002 | Young et al. | 345/706 |
| 2002/0147004 A1 | * | 10/2002 | Ashmore | 455/414 |

* cited by examiner

*Primary Examiner*—Saleh Najjar
*Assistant Examiner*—Oanh Duong
(74) *Attorney, Agent, or Firm*—Zilka-Kotab, PC

(57) ABSTRACT

A system, method and computer program product are provided for network-based information management. A first habitat is initiated. The first habitat has markers that are utilized for identifying information selected by a user. The information associated with the markers is retrieved and displayed on an information screen of the first habitat utilizing a network. Multiple users are allowed to view the information screen of the first habitat. A second habitat is also allowed to access the first habitat for retrieving information from the first habitat.

19 Claims, 11 Drawing Sheets

METHOD AND COMPUTER PROGRAM PRODUCT FOR CUSTOMIZED INFORMATION MANAGEMENT BY ALLOWING A FIRST HABITAT TO ACCESS OTHER HABITATS TO RETRIEVE INFORMATION FROM THE OTHER HABITATS

RELATED APPLICATIONS

This application claims the benefit of U.S. Provisional Application entitled "SYSTEM, METHOD AND COMPUTER PROGRAM PRODUCT FOR AN INFORMATION HUB" filed provisionally Apr. 12, 2001 under Ser. No. 60/283,775. The present application is a continuation-in-part of an application entitled "SYSTEM, METHOD AND ARTICLE OF MANUFACTURE FOR WIRELESS ENABLEMENT OF THE WORLD WIDE WEB USING A WIRELESS GATEWAY," and filed Jun. 16, 2000 under the Ser. No. 09/595,781, now U.S. Pat. No. 6,438,575 and which is incorporated herein by reference in its entirety.

FIELD OF THE INVENTION

The present invention relates to user interfaces and more particularly to generating intelligent network-based information hubs.

BACKGROUND OF THE INVENTION

Information on the web exists in the form of hyperlinks that appear in different web sites. A news site for example may contain headlines that are hyperlinks to their detailed exposition. Custom Internet portals to display web-centric information exist (e.g., myYahoo, myLycos etc.). The level of customization is however, fairly minimal. In typical portals, the user chooses from a pre-determined set of headlines collected from a predetermined set of web-sites. The user has no control over either the web-sites he/she gets the content from or the headlines that are taken from those web-sites. Further, the user has very little control over how the information is presented.

For example, if the user is interested in Indian politics, Soccer, Cricket, and Semiconductor High Tech companies, myYahoo allows the user to configure Yahoo's news source to filter through news on these topics. However, the user must take all this content strictly from Yahoo-selected content providers. This arrangement prohibits users from choosing not just the type of content but the source of the content as well. While, for example, a user may want to be able to receive world politics news from his two favorite Indian news dailies every morning, get his Hi-Tech news coverabe from Red Herring and Cnet, and get sports news from Cricket.org and dailysoccer.com, access to all these sites through a prior art internet portal would be predicated on the Internet portal offering access to all of the particular site via that particular portal.

What is needed is a method that allows the user to completely configure both the source and content that he/she wants on his/her own portal as well as allow others to access the portal. What is further needed is communications between portals of various users.

SUMMARY OF THE INVENTION

A system, method and computer program product are provided for network-based information management. A first habitat is initiated. The habitat is a personalized information management system that gathers, stores and displays information of interest to the user. The selection and presentation of the information is customizable by the user. Note that several users can be allowed to customize the same habitat. The information managed in the habitat can be viewed/accessed by a client device, such as a computer, Personal Digital Assistant (PDA), web phone, wireless telephone, pager, or any other device capable of storing and/or outputting the information, whether by a direct connection or via wireless transmission.

The first habitat has markers that are utilized for identifying information selected by a user. Such information can include text, graphics, video, audio, database information, outputs of applications, or any other type of content/information. The markers can be automatically generated upon the user selecting desirable content. The markers can be pointers to the information stored locally as well as links to information stored remotely.

The information associated with the markers is retrieved from the data site, database, etc. and displayed on an information screen (such as a web page) of the first habitat utilizing a network which is preferably the Internet. Multiple users are allowed to view the information screen of the first habitat. Privileges for access can vary, and can be set by the user. The first habitat can access other habitats to retrieve information from them. Other habitats may also be allowed to access the first habitat.

In a preferred embodiment, the first habitat selects portions of the retrieved information for display based on user-input. Note that each of the habitats can have an assigned address such as a web address.

According to one embodiment of the present invention, a point-to-point connection between habitats can be created. Here, the first habitat connects directly to one or more habitats for selecting and retrieving the information from the habitat(s).

A peer to peer model for habitat-to-habitat information retrieval can also be provided. In this model, the first habitat sends out a request for desired information to a plurality of habitats and retrieves the desired information from one or more of the habitats that respond to the request preferably via a point-to-point connection.

According to another embodiment of the present invention, the first habitat is in communication with a plurality of habitats such that a sub-network of habitats is formed. This enables such things as real-time updates of the various habitats when content changes in one of the habitats. Also, a user viewing the information of the first habitat can "jump" to one of the other habitats to view the information available there.

According to yet another embodiment of the present invention, application-habitat communication is enabled. Thus, an application can communicate with the first habitat for retrieving information from the first habitat. Further, the first habitat can interact with the application for performing tasks such as presenting output of the application, for example.

BRIEF DESCRIPTION OF THE DRAWINGS

The invention will be better understood when consideration is given to the following detailed description thereof Such description makes reference to the annexed drawings wherein.

DETAILED DESCRIPTION OF THE PREFERRED EMBODIMENTS

Figure 1:
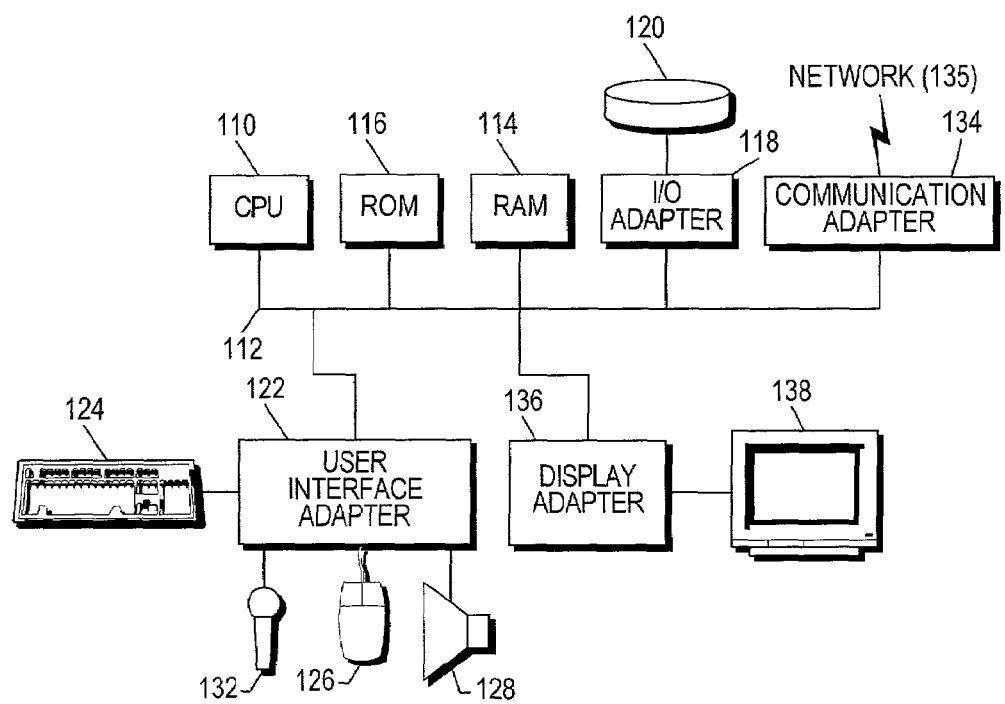
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (Nov. 1995); and R. Fielding, H, Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and clientside performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Information Portal

The present invention allows a user to create an information portal whose source and content is completely customizable. Information on the web exists in the form of hyperlinks that appear in different web sites. A news site for example may contain headlines that are hyperlinks to their detailed exposition. In typical portals, the user chooses from a pre-determined set of headlines collected from a pre-determined set of web-sites. The user has no control over either the web-sites he/she gets the content from or the headlines that are taken from those web-sites. The present invention allows the user to completely configure both the source and content that he/she wants on his/her own portal.

Figure 2:
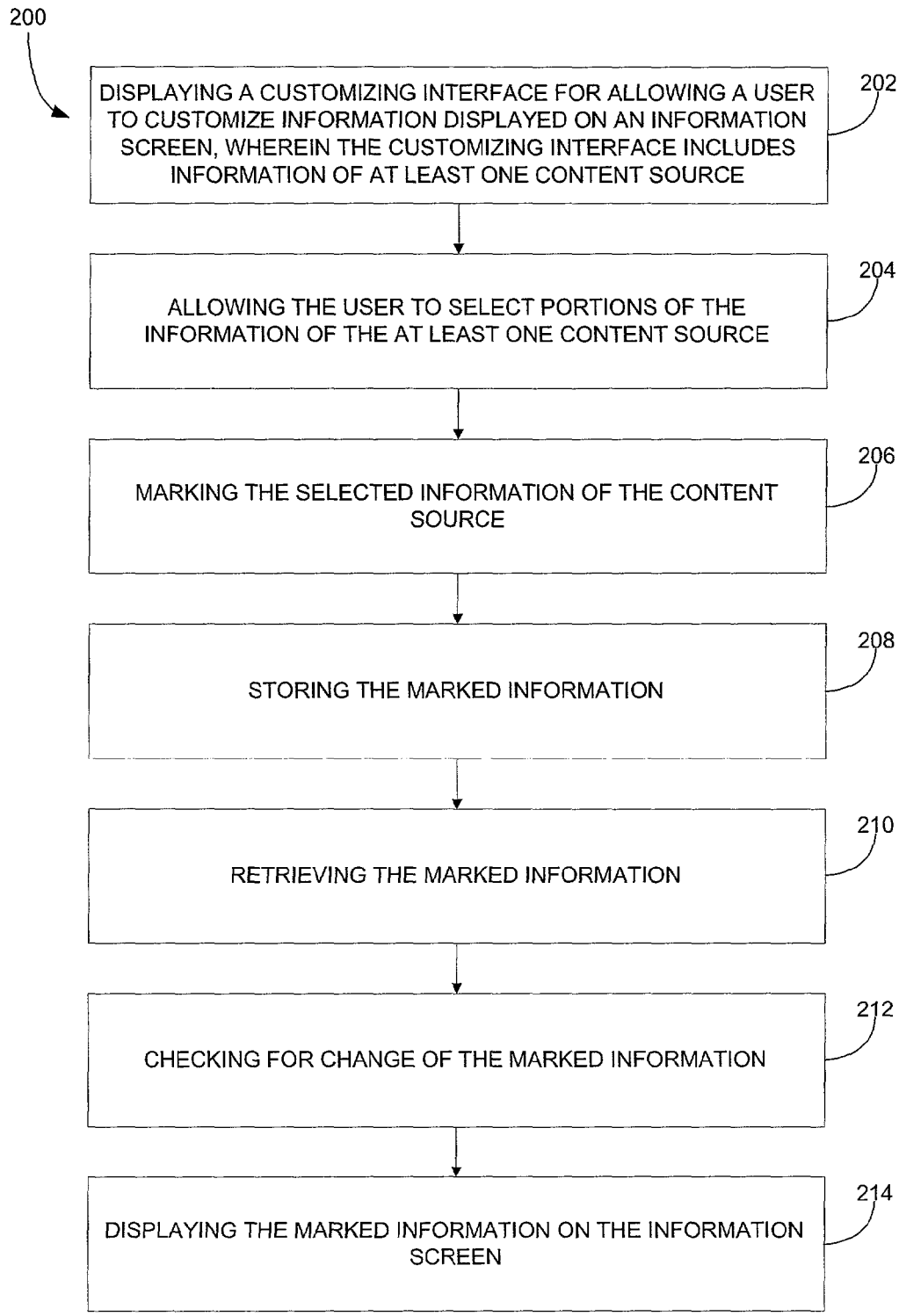
FIG. 2 illustrates a process for generating a customized network user interface a according to one embodiment of the present invention.

FIG. 2 illustrates a process 200 for generating a customized network user interface. A management interface is provided in operation 202. The management interface allows a user to select and manage information that is displayed on an information screen and viewed by the user. The management interface includes information of at least one content source which can be selected. It should be noted that such information can include such things as portions of web pages, links to web pages, or any other type of information. Such a content source can be a web page or any other content source. In operation 204, the user is further allowed to select portions of the information of one or more of the content sources. The selected information of the content source may then be marked in operation 206. In operation 208, such marked information is stored for subsequent retrieval in operation 210. Various changes in the marked information may be checked in operation 212, and in operation 214, the marked information may then be displayed on the information screen.

In one embodiment of the present invention, the information screen may include a plurality of different views. Each view may contain at least one window for displaying the marked information. Further, the user may be allowed to select, maximize, minimize, refresh and edit the content of the window.

In another embodiment of the present invention, the user may be allowed to share the views with other users such as via electronic mail or by permitting access to the views. As an option, the marked information may be presented on the information screen over a configurable number of days in the past. Further, the user may be allowed to drag and drop the information from the customizing interface to the information screen. The information may also be marked upon dropping the information in the information screen.

In still yet another embodiment, the step of marking the selected information may include determining an address of the selected information and a table, row, column, and/or cell of the selected information. Further, the step of checking for change of the marked information may include the steps of determining whether the content of the marked information has changed and determining whether the format of the marked information has changed. As yet another option, the step of checking for change of the marked information may be performed at predetermined intervals.

According to a preferred embodiment of the present invention, the user is presented with a page that contains the user's information of choice from an arbitrary number of different sources and presented in a completely customizable format. The page consists of different "views" where each view in turn contains multiple windows. The number of views and the number of windows in each view can be configured.

Each particular window contains hyperlinks that have been selected by the user from web-sites of his/her choice. A window may for instance be dedicated for international news and could contain hyperlinks selected by the user from any number of web-sites of his/her choice. The user has complete freedom in selecting the source of his/her content (i.e. the web-site) and the content from that source (i.e. the hyperlinks).

Figure 3:
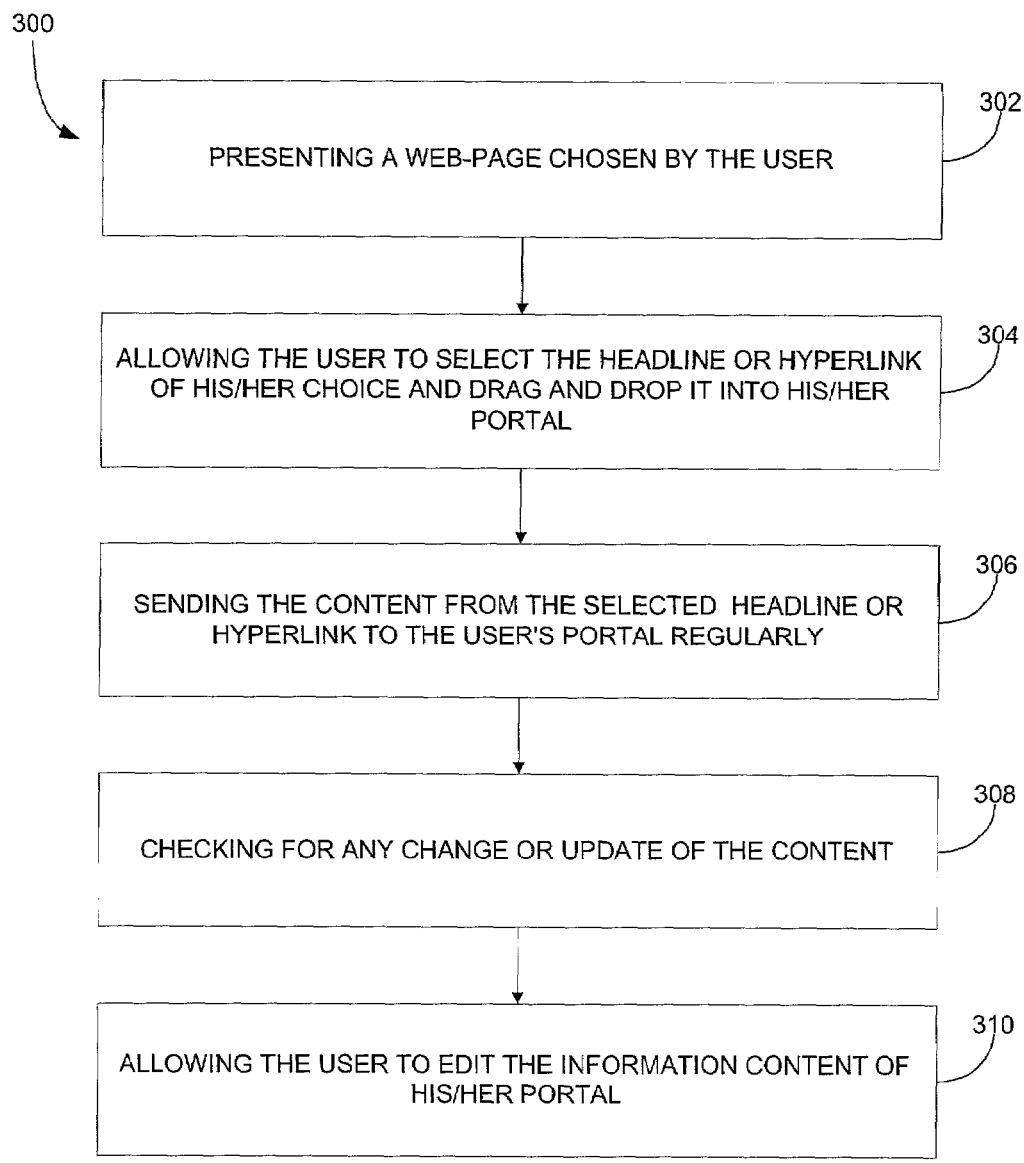
FIG. 3 is a flowchart of a process for allowing a user to customize an information portal according to one embodiment of the present invention.

FIG. 3 is a flowchart of a process 300 for allowing a user to customize an information portal according to one embodiment of the present invention. When the user wishes to add content, a web-page chosen by the user is presented in operation 302. In operation 304, the user is then allowed to select the headline or hyperlink of his/her choice and simply drags and drops it into his/her portal. From that point on, in operation 306, the content from that headline or hyperlink will be brought to the user's portal regularly. In operation 308, a check for any change or update of the content is made. If the content changes or is refreshed, the new content will be brought to the user. In operation 310, the user is further allowed to edit the content of his/her portal at will by adding or deleting headlines, moving them from one window to another within a view or moving them to other windows in different views.

Another embodiment of the present invention includes the following parts: (a) An interface that displays the user customized information, (b) an interface that allows the user to select and manage the information of choice, (c) a mechanism for marking selected information contained in a web-page (d) a method for communicating that information to the backend servers that process and store that information, (e) a mechanism for the storage of the selected information (f) a mechanism for regularly retrieving selected information and (g) a mechanism for checking for change in the content or the format of the selected sources of information.

The User Interface to Display Preferred Content.

The user interface comprises "views", each of which contain multiple windows. The number of windows in a view is completely configurable. The user may create or delete as many views as he/she may desire. This user interface allows a user to cleanly categorize related information within individual windows and views. This provides a user one place to access all of his/her favorite information and content from the web. This content includes (but is not limited to) (a) News and Information headlines (of all sorts) (b) Information about email, bank and other accounts (c) Information about shopping and comparison of rates and prices (d) Graphs, Images, Sounds or any other media.

This content is presented to the user with an ability to edit and manage it intuitively and interactively. Some of the features of the management process include (a) a presentation of the user's selected information over a configurable number of days in the past (b) an ability to select, maximize, minimize, refresh or edit the content of individual windows (c) to "publish" user's views into a directory of views and (d) to share these views with other people by emailing them the views.

The Interface for Selection and Management of Preferred Content.

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred content. There are two levels of selection and management provided, default and advanced.

Figure 4:
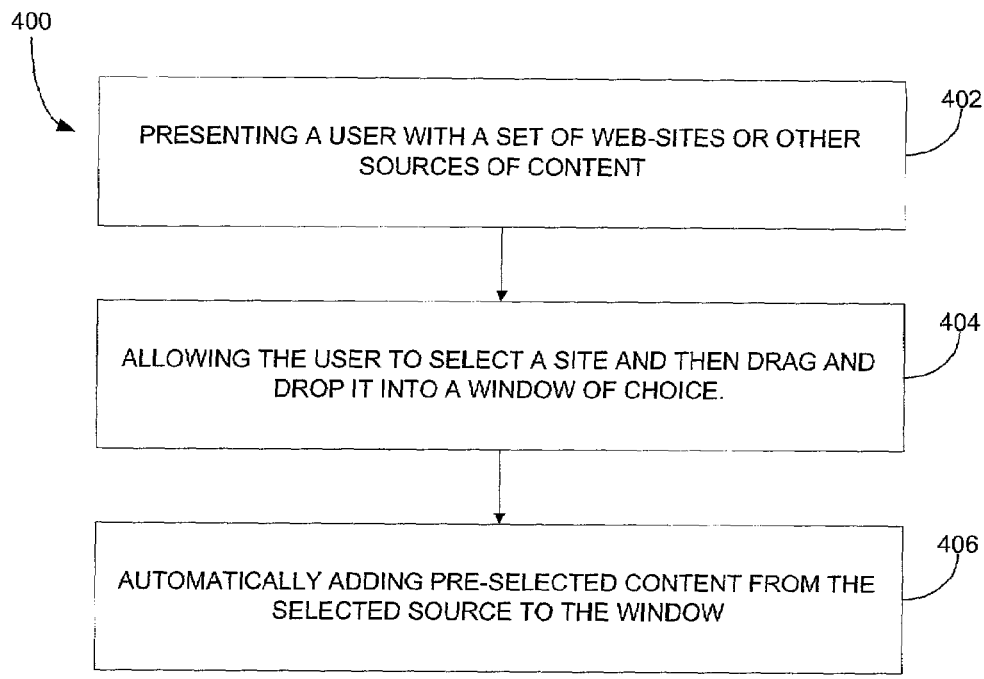
FIG. 4 depicts a default mode process for allowing selection and management of preferred content according to one embodiment of the present invention.

Referring to FIG. 4, in a default mode process 400 for allowing selection and management of preferred content according to one embodiment of the present invention, a user is presented with a set of web-sites or other sources of content in operation 402. In operation 404, the user is allowed to select a site and then drag and drop it into a window of choice. Once that is done, pre-selected content from that source is automatically added to the window in operation 406.

Figure 5:
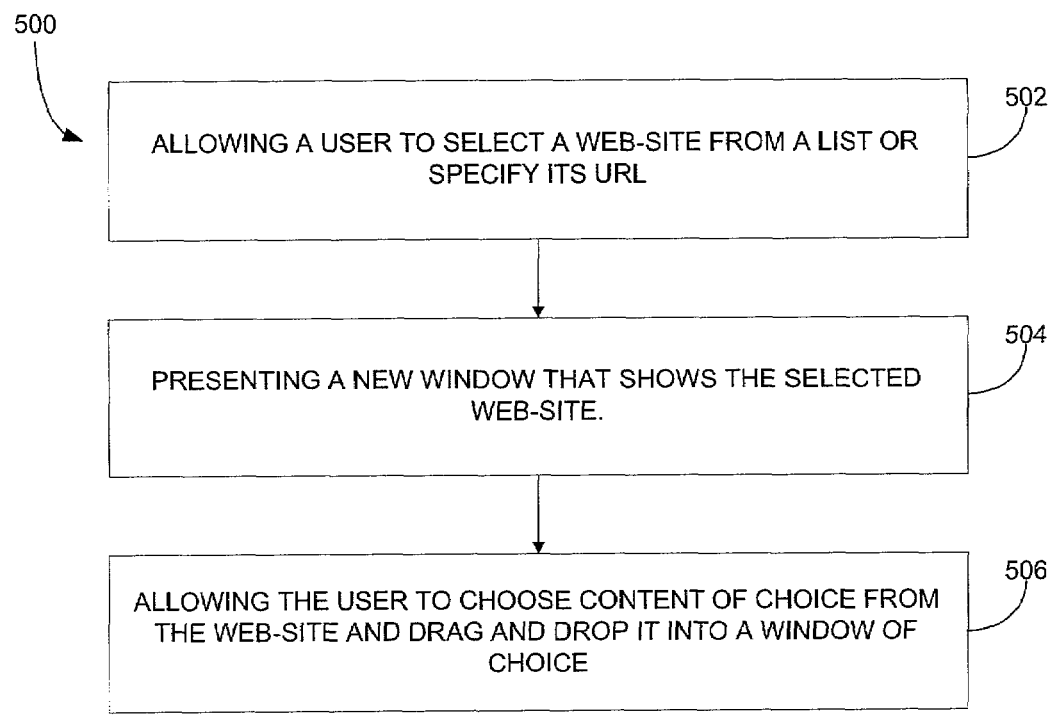
FIG. 5 is a flowchart of an advanced mode process for allowing selection and management of preferred content according to an embodiment of the present invention.

FIG. 5 is a flowchart of an advanced mode process 500 for allowing selection and management of preferred content according to an embodiment of the present invention. In operation 502, a user is allowed to select a web-site from a list or specify its URL. A new window is presented in operation 504 that shows the selected web-site. In operation 506, the user is allowed to choose content of choice from the web-site and drag and drop it into a window of choice.

The Mechanism for Tagging Selected Information Contained in a Web-Page.

Web-pages are created using HTML (Hyper Text Markup Language). The content in a web-page is formatted using a tabular format where each table is composed of individual cells distributed into a number of rows and columns. A table may contain other tables within its individual cells. The tagging of selected information within a web-page hinges upon assigning an address to each item of content within the webpage. The addressing scheme takes into account the table(s), row(s), column(s) and cell(s) an item of content belongs to. An item of content can be identified by its address within a web-page and (ii) all the addressing schemes that take into account the table(s), row(s), column(s) and cell(s) an item of content belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of content resides within a cell that belongs to a specific row and column of a table. The complete address of an item of content is then the unique identifier of the table that contains it and the position of that item of content within that table.

Figure 6:
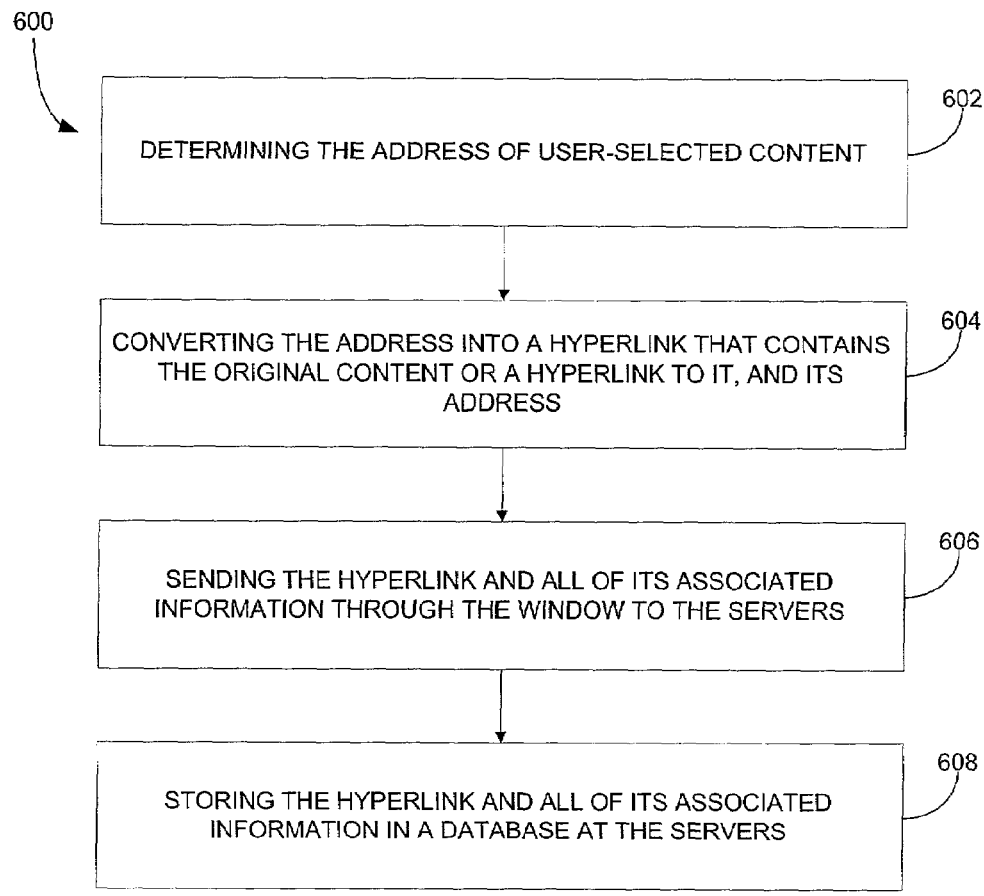
FIG. 6 is a flowchart depicting a process for tagging selected information contained in a web-page according to one embodiment of the present invention.

FIG. 6 is a flowchart depicting a process 600 for tagging selected information contained in a web-page. In operation 602, the address of user-selected content is determined, as set forth above. Once the address is determined, it is converted in operation 604 into a hyperlink that contains the original content or a hyperlink to it, and its address. When a user drags and drops that selected content into a window of choice, that hyperlink and all of its associated information is sent through the window to the servers in operation 606, where it is entered into a database in operation 608.

This mechanism also allows a capture of configurable sections of a web-page, including individual words, lines, paragraphs.

Figure 7:
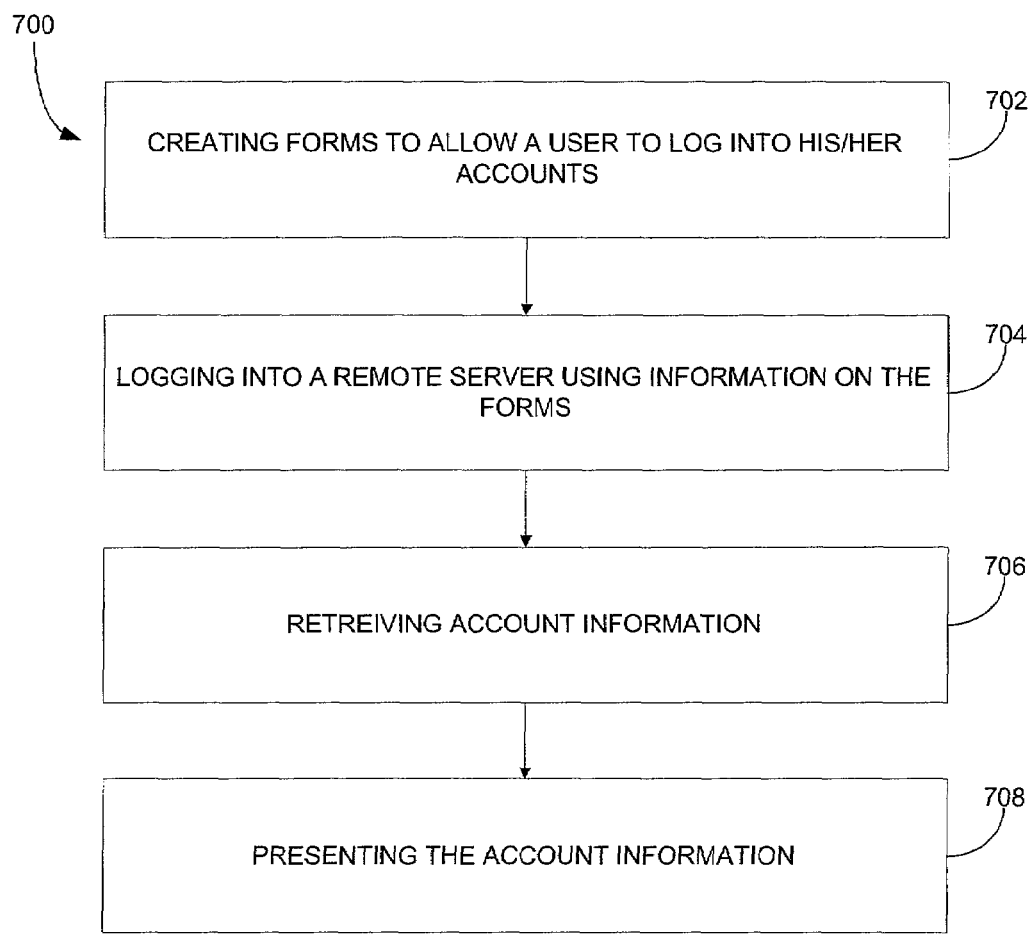
FIG. 7 is a flow diagram of a process for tagging secure information contained in a web-page.

In the case of secure information like email or bank accounts, the mechanism followed is shown in FIG. 7, which is a flow diagram of a process 700 for tagging secure information contained in a web-page. First, in operation 702, forms are created to allow a user to log into their accounts. These forms consist of (a) Dynamic information (like the user name and password) which is captured during the session (b) Static information that is required by the remote account server which is stored in a database and retrieved when an account is selected. Using the dynamic and static information, the server logs into the remote server in operation 704. The account information is retrieved in operation 706 and, in operation 708, the account information is presented in a suitable and configurable format.

The Mechanism for Local Storage or Caching of Selected Content.

The selected information is cached or stored locally to enable a faster access. Once a web site is selected by a user, a copy of the site, including text and images, is kept locally in the servers. When any user requests a page that has been requested before, the cached copy is presented if the content of the site has not changed since the time the page was cached. The process is broken down into two: Simple and Customized addition of content:

Addition of Default Content

The addition of default content proceeds as follows:
1. Once a site is selected, the backend identifies the headlines that have been pre-selected for that site.
2. The server queries the database and picks up the default headlines.
3. The headlines that are not included in the pre-selected content are not included.
4. The server contacts the ActiveX control that constitutes the administrative page and communicates the selected headlines.
5. The selected headlines are visible in the ActiveX control and are also accessible to the main user interface.

Addition of Customized Content

In the case of addition of customized content, the process is as follows:
1. The user selects a hyperlink by dragging and dropping them into the ActiveX control on the Administrative page.
2. The hyperlink and related information are sent to the servers. The information includes (a) the content of the link, (b) its location on the page, (c) the URL of the site, (d) the identity of the window and the view it has been dropped into and (e) the user name.
3. Once the link has been selected, it is added to the database and is accessible to the main user interface.

The Mechanism for Communication of Selected Information to the Backend Servers.

Once a hyperlink is dropped into a window, information is passed by the window to the backend servers. This information includes the address of the hyperlink, as defined above. In addition, the information about the window and the view containing that window is also sent to the server. This information is then used by scripts to generate the front page in HTML.

The Mechanism for Regular Retrieval of Preferred Content from Selected Sites.

The power of the current invention is that refreshed content is retrieved from the selected sources of information as they are updated. The sources of information, or web sites, selected by users are cached locally. The web pages stored locally are categorized according to the number of times they are requested. High request sites are retrieved once every few hours, for example.

The Mechanism to Check for a Change of Content or Format in the Selected Sources of Information.

Once a page has been requested by a user, it is retrieved on a regular basis. There are two checks performed to find out a change in the information in the page. The first involves a change in the content of the page and the second a change in the format in which the content is presented.

Change in a Page's Content:

Every time a page is retrieved, a copy is kept locally on servers. Once a page is automatically retrieved, the content from the newly retrieved version of the page is compared to the content from a previous version of the page. If there is a change in the content, then the updated content is retrieved.

A Change in the Format of the Content:

The formatting of the content in a page is stored in terms of a complete addressing scheme for the page, which specifies the breakdown of the page into its sub-sections. Once there is a change in the formatting of the page, then the relations of different subsections of the page to their parent sections change. A mechanism is implemented that keeps track of the number of differences between the format of a previously stored version of the page and the newly retrieved version. An alert is sent to the users if the number of differences is greater than a configurable number.

Habitat

Figure 8:
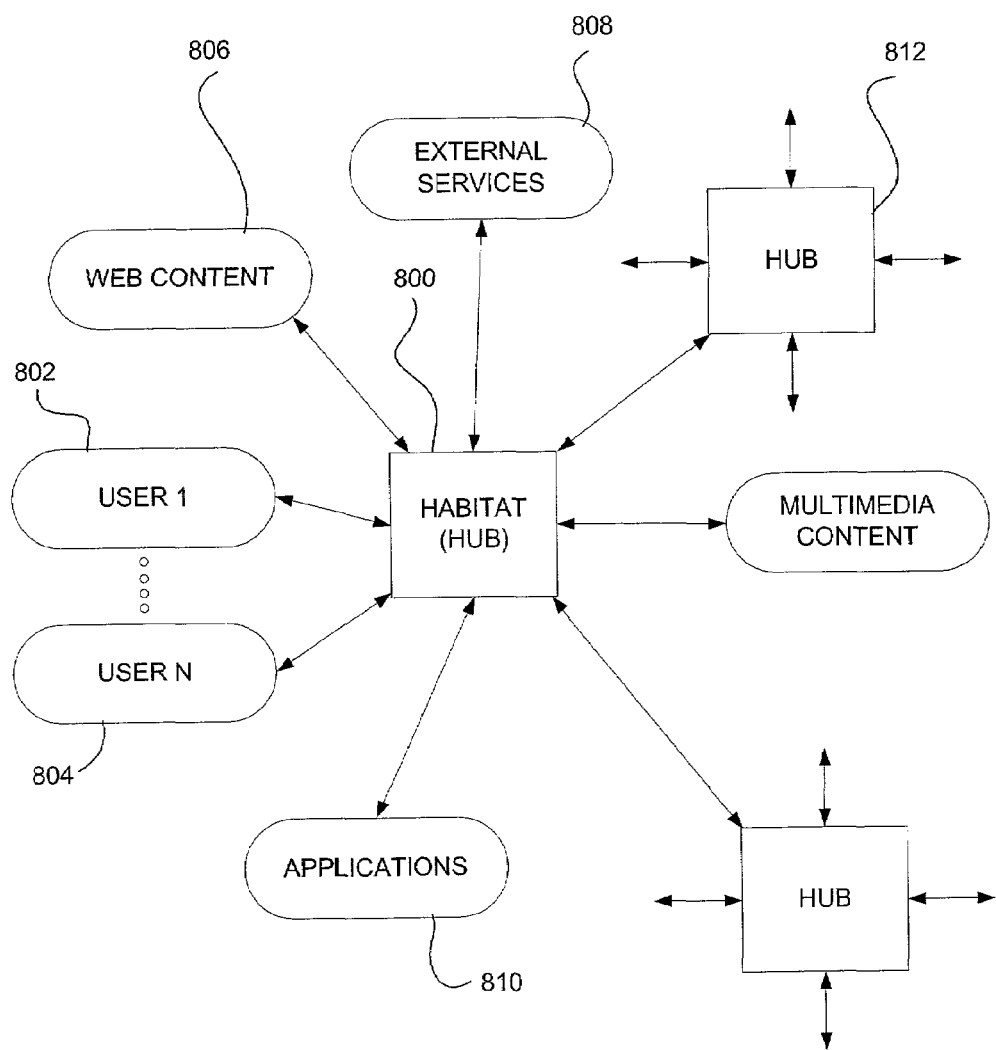
FIG. 8 depicts a habitat in communication with users, content, external services, applications, and other habitats.

FIG. 8 depicts a habitat 800 in communication with users 802, 804, content 806, external services 808, applications 810, and other habitats 812. An Internet habitat ("a habitat") allows a user to create an information portal whose source and content is completely customizable. The habitat is a personalized information management system that gathers, stores and displays information of interest to the user. The selection and presentation of the information is customizable by the user. Note that several users can be allowed to customize the same habitat. The information managed in the habitat can be viewed/accessed by a client device, such as a computer, Personal Digital Assistant (PDA), web phone, wireless telephone, pager, or any other device capable of storing and/or outputting the information, whether by a direct connection or via wireless transmission.

Information on the web exists in the form of hyperlinks that appear in different web sites. A news site for example may contain headlines that are hyperlinks to their detailed exposition. In typical portals, a user chooses from a predetermined set of headlines collected from a pre-determined set of web-sites. A user has no control over either the web-sites the user gets the content from or the headlines that are taken from those web-sites. A habitat allows a user to completely configure both the source and content that user personally desires in an information portal.

In a preferred embodiment, the habitat allows a user to create a customized portal based on an intuitive drag and drop capability. A user simply selects the sources or headlines of choice and drags and drops them into windows and views of choice. This drag and drop feature also makes customization easy for the user, allowing quick compilation and management of preferred content.

Figure 9:
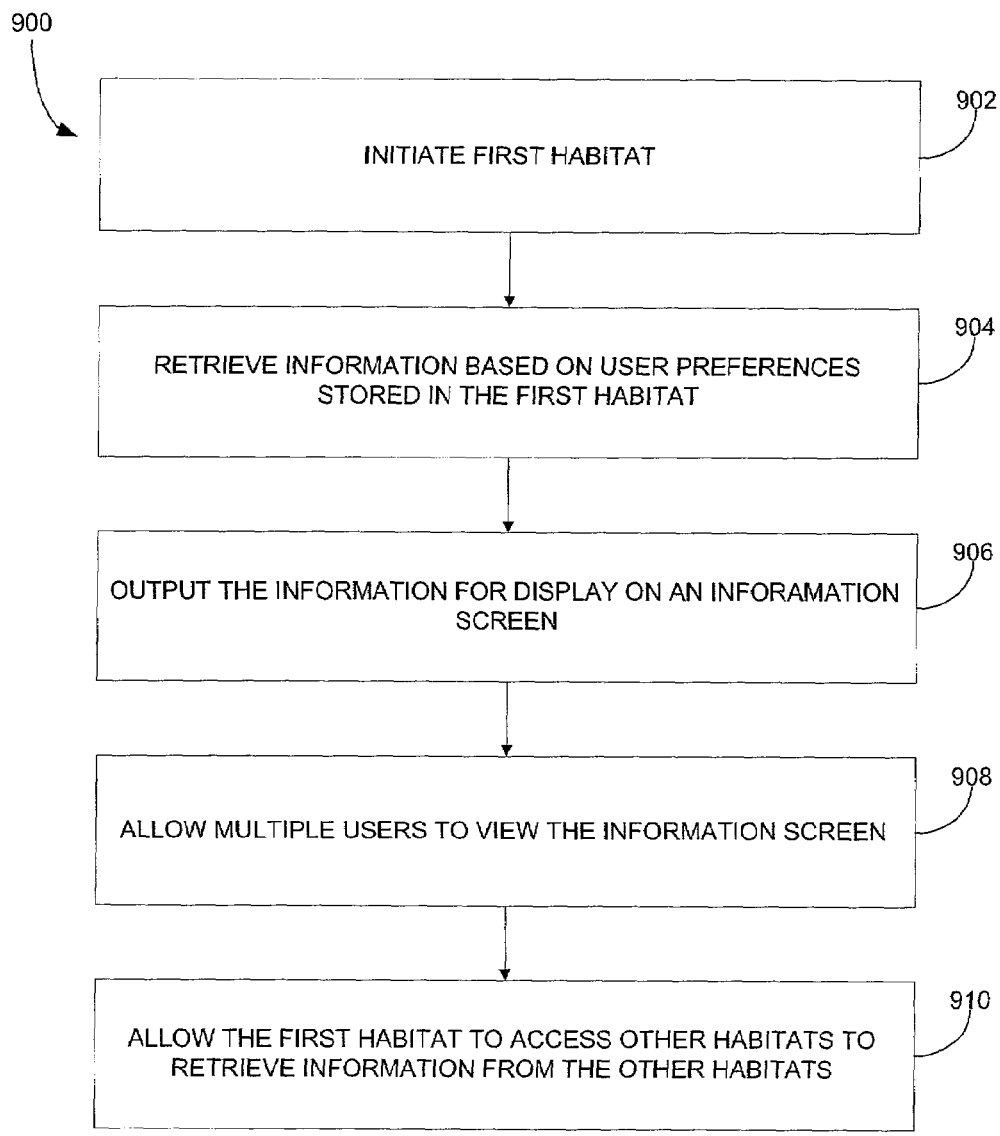
FIG. 9 is a flow chart depicting a process for network-based information management according to an embodiment of the present invention.

FIG. 9 depicts a process 900 for network-based information management according to an embodiment of the present invention. In operation 902, a first habitat is initiated. The first habitat has markers that are utilized for identifying information selected by a user. Such information can include text, graphics, video, audio, database information, outputs of applications, or any other type of content/information. The markers can be automatically generated upon the user selecting desirable content. The markers can be pointers to the information stored locally as well as links to information stored remotely.

In operation 904, the information associated with the markers is retrieved from the data site, database, etc. and, in operation 906, displayed on an information screen (such as a web page) of the portal of the first habitat utilizing a network which is preferably the Internet. In operation 909, multiple users are allowed to view the information screen of the first habitat. Privileges for access can vary, and can be set by the user. The first habitat is allowed to access other habitats in operation 910 for retrieving information from the other habitats.

According to an embodiment of the present invention, other habitats retrieve information from the first habitat and/or other habitats. In an example of use, a first user has similar interests in investing as a second user, but the first user is not as adept at finding investment news. The habitat of the first user can automatically retrieve investment news from the habitat of the second user.

In a preferred embodiment, the first habitat selects portions of the retrieved information for display based on user-input. Continuing with the investment example, perhaps the user only wishes to review information about stocks listed on the Nasdaq Combined Composite Index and not those traded on the Dow Jones Industrial Exchange. The first habitat would then perform an analysis on the information in the second habitat either prior to or after retrieval to select only the information pertinent to the Nasdaq for display. Such analysis can include a key word search, such as a search for "Nasdaq" or the symbol of a particular stock known to be listed on the Nasdaq. Note that each of the habitats can have an assigned address such as a web address.

According to one embodiment of the present invention, a point-to-point connection between habitats can be created. Here, the first habitat connects directly to one or more habitats for selecting and retrieving the information from the habitat(s).

A peer to peer model for habitat-to-habitat information retrieval can also be provided. In this model, the first habitat sends out a request for desired information to a plurality of habitats and retrieves the desired information from one or more of the habitats that respond to the request preferably via a point-to-point connection.

According to another embodiment of the present invention, the first habitat is in communication with a plurality of habitats such that a sub-network of habitats is formed. This enables such things as real-time updates of the various habitats when content changes in one of the habitats. Also, a user viewing the information of the first habitat can "jump" to one of the other habitats to view the information available there.

According to yet another embodiment of the present invention, application-habitat communication is enabled. Thus, an application can communicate with the first habitat for retrieving information from the first habitat. Further, the first habitat can interact with the application for performing tasks such as presenting output of the application, for example.

A customizable information retrieval engine has thus been described that allows users to aggregate content of their choice from any web-site in existence. The content may include, but is not restricted to: text (i.e. news headlines, hyperlinks in web-pages), secure account information (i.e. email, bank accounts, utilities, and stock portfolios), services (i.e. maps, directions, weather, web searches), financial transactions (i.e. online shopping, buying, selling, trading, auctions, barters, comparisons) and other dynamic tasks that involve interaction of the users with other web-based (client and server side) services. The aggregated content may be displayed in a customized web-based habitat, which is amenable to presentation and content customization through an intuitive interface.

Gateway

Figure 10:
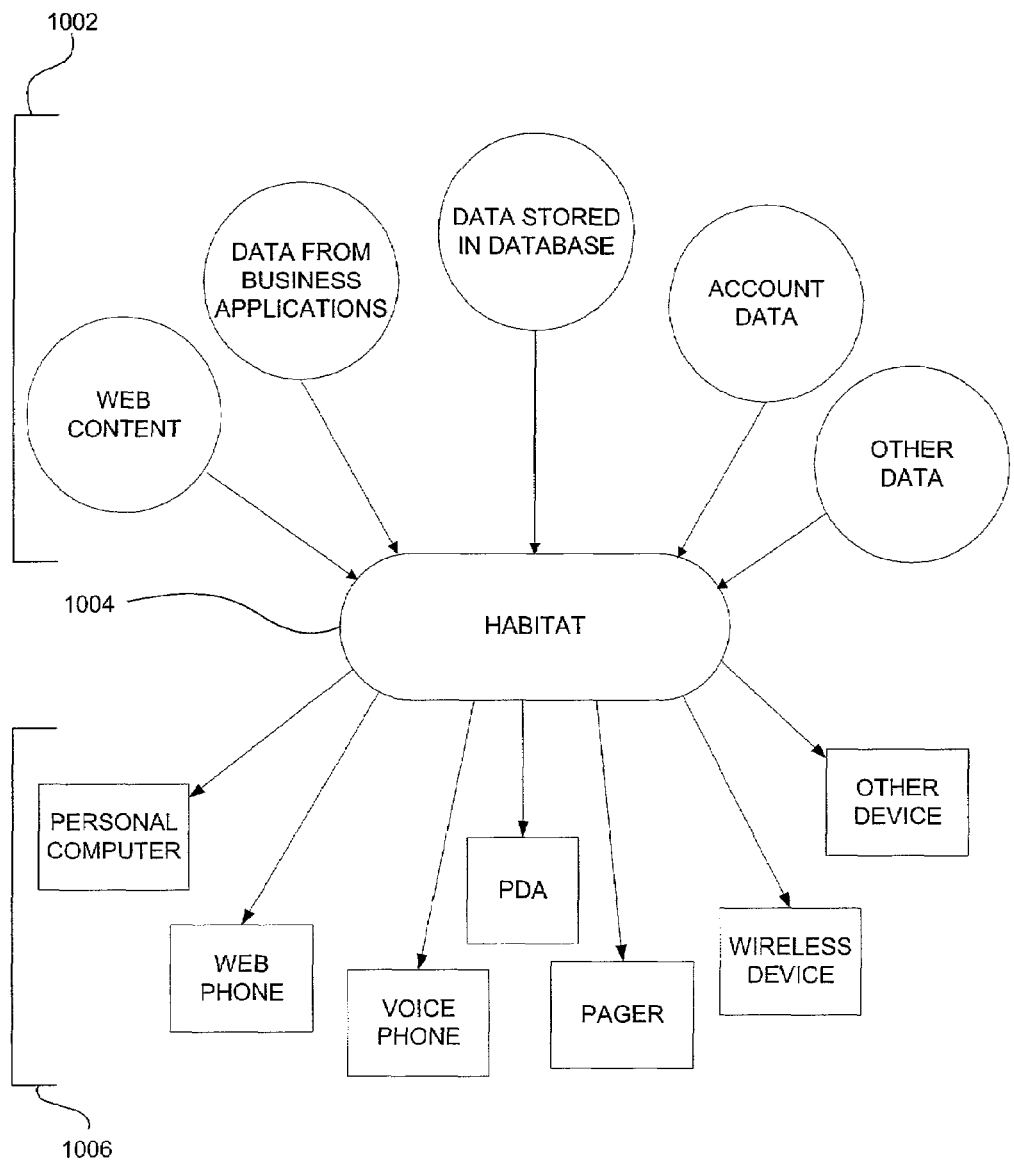
FIG. 10 illustrates an overall flow of data through a gateway to various client devices of a user, according to an embodiment of the present invention.

FIG. 10 illustrates an overall flow of data 1002 through a gateway 1004 to various client devices 1006 of a user, according to an embodiment of the present invention. As shown, data from any network-based data source can be downloaded into the habitat, which acts as the gateway. A function is applied to the data in the habitat and the data is then sent out to a remote client device.

Figure 11:
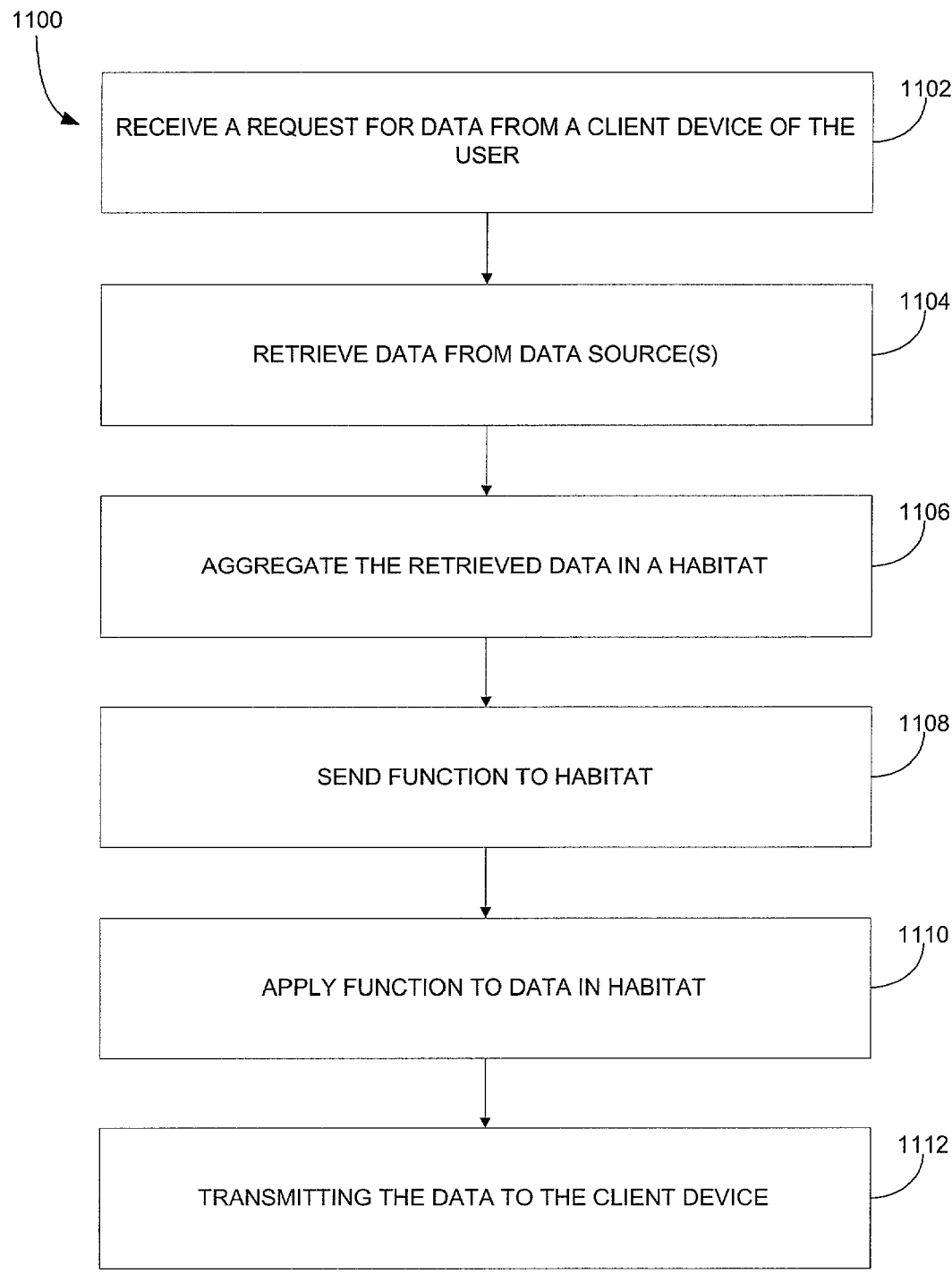
FIG. 11 is a flow diagram of a process for applying a function to a gateway for universal application of a function to data for output on a remote client device.

FIG. 11 is a flow diagram of a process 1100 for applying a function to a gateway for universal application of a function to data for output on a remote client device. In operation 1102, a request may be received from a client device of a user, where the request includes user-defined information specifying data to be retrieved from a network data source. Alternatively, the present invention can send the data proactively without any such request. In operation 1104, data from one or more network-based data sources is retrieved utilizing the user-defined information. Such user-defined information can be user preferences, specification of content to be retrieved from the network, a request for information, etc. The retrieved data is aggregated in a habitat preferably at a network server located remotely from the user in operation 1106. The habitat provides a gateway through which the data flows from a data source to the client device of the user. A function is sent to the habitat in operation 1108, and in operation 1110, the function is applied to the aggregated data in the habitat. In operation 1112, the data is transmitted to the client device.

Again, such data can be text, secure account information, services, output of an application, financial transactions, etc. In an embodiment of the present invention, the data may be aggregated on a portal page of the habitat, where the portal page is unique to the user.

According to one embodiment of the present invention, the function is for manipulating the data for output on a particular type of client device. For example, the data in the habitat can be wireless enabled by applying a wireless function to the data to format the data for output on a wireless device, as set forth above with reference to FIGS. 1–5. Preferably, the application of the function to the aggregated data in the habitat includes identifying a client device of the user to which the aggregated data is to be sent, determining a communications protocol compatible with the client device, and formatting the aggregated data at the network server utilizing the communications protocol for output to the client device.

In another embodiment of the present invention, the function is for voice enabling the aggregated data such as converting textual content into audible synthesized speech. Such voice enablement can also include speech recognition technology to convert spoken user input into commands for accessing and/or manipulating the data. A variety of commercial quality, speech recognition engines are readily available on the market, as practitioners will know. For example, Nuance Communications offers a suite of speech recognition engines, including Nuance 6, its current flagship product, and Nuance Express, a lower cost package for entry-level applications. As one other example, IBM offers the ViaVoice speech recognition engine, including a low-cost shrink-wrapped version available through popular consumer distribution channels. Basically, a speech recognition engine processes acoustic voice data and attempts to generate a text stream of recognized words.

It should be noted that the above-mentioned functions are set forth by way of example, and that many types of functions can be applied to the data in the habitat in accordance with the present invention.

The retrieved data can be updated form the network after a predetermined amount of time has expired and the process depicted in FIG. 10 repeated. The user can also be allowed to interact with the data.

Preferably, an alert is sent to the client device upon occurrence of a prespecified condition such as an update of the data, etc. As stated in more detail above, the client device can be a personal digital assistant (PDA), a personal (including laptop) computer, a handheld computer, a wireless or hardwired telephone, a device connected to a wireless modem, a pager, etc.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for network-based information management, comprising the steps of:
    (a) initiating a first habitat having markers utilized for identifying information selected by a user;
    (b) retrieving the information associated with the markers;
    (c) displaying the selected information on an information screen of the first habitat utilizing a network;
    (d) allowing a plurality of users to view the information screen of the first habitat based on an access privilege set by the user; and
    (e) allowing the first habitat to send a request to a second habitat for desired information and access the second habitat for retrieving the requested information from the second habitat, the second habitat sending information matching the request directly to the first habitat,
    wherein the first and second habitats each includes a personalized information management system that gathers, stores, and displays information of user interest.

2. A method as recited in claim 1, wherein the second habitat retrieves information from the first habitat.

3. A method as recited in claim 2, wherein the first habitat selects portions of the retrieved information for display based on user-input.

4. A method as recited in claim 1, wherein a user viewing the first habitat provided with the ability to jump directly to the second habitat for viewing information in the second habitat.

5. A method as recited in claim 1, wherein the first habitat sends out a request for desired information to a plurality of habitats and retrieves the desired information from at least one of the habitats responding to the request.

6. A method as recited in claim 1, wherein the first habitat is in communication with a plurality of habitats such that a sub-network of habitats is formed.

7. A method as recited in claim 1, wherein an application communicates with the first habitat for retrieving information therefrom.

8. A method as recited in claim 1, wherein the first habitat interacts with an application for performing tasks.

9. A method as recited in claim 1, wherein each of the habitats has an assigned address.

10. A computer program product embodied on a computer readable storage medium for network-based information management, comprising:
    a) computer code for initiating a first habitat having markers utilized for identifying information selected by a user;
    (b) computer code for retrieving the information associated with the markers;
    (c) computer code for displaying the selected information on an information screen of the first habitat utilizing a network;
    (d) computer code for allowing a plurality of users to view the information screen of the first habitat based on an access privilege set by the user; and
    (e) computer code for allowing the first habitat to send a request to a second habitat for desired information and access the second habitat for retrieving the requested information from the second habitat, the second habitat sending information matching the request directly to the first habitat,
    wherein the first and second habitats each includes a personalized information management system that gathers, stores, and displays information of user interest.

11. A computer program product as recited in claim 10, wherein the second habitat retrieves information from the first habitat.

12. A computer program product as recited in claim 11, wherein the first habitat selects portions of the retrieved information for display based on user-input.

13. A computer program product as recited in claim 11, wherein the first habitat connects directly to the second habitat for retrieving the information from the second habitat.

14. A computer program product as recited in claim 10, wherein the first habitat sends out a request for desired information to a plurality of habitats and retrieves the desired information from at least one of the habitats responding to the request.

15. A computer program product as recited in claim 10, wherein the first habitat is in communication with a plurality of habitats such that a sub-network of habitats is formed.

16. A computer program product as recited in claim 10, wherein an application communicates with the first habitat for retrieving information therefrom.

17. A computer program product as recited in claim 10, wherein the first habitat interacts with an application for performing tasks.

18. A computer program product as recited in claim 10, wherein each of the habitats has an assigned address.

19. A system embodied on a computer readable storage medium for network-based information management, comprising:
    (a) logic for initiating a first habitat having markers utilized for identifying information selected by a user;
    (b) logic for retrieving the information associated with the markers;
    (c) logic for displaying the selected information on an information screen of the first habitat utilizing a network;
    (d) logic for allowing a plurality of users to view the information screen of the first habitat based on an access privilege set by the user; and
    (e) logic for allowing the first habitat to send a request to several habitats for desired information and access one or more of the habitats responding to the request for retrieving the requested information from the habitat responding to the request, the habitat responding to the request sending information matching the request directly to the first habitat;
    (f) wherein a user viewing the first habitat is provided with the ability to jump directly to a second habitat for viewing information in the second habitat, and the first and second habitats each includes a personalized information management system that gathers, stores, and displays information of user interest.

* * * * *

UNITED STATES PATENT AND TRADEMARK OFFICE
CERTIFICATE OF CORRECTION

| | | |
|---|---|---|
| PATENT NO. | : 7,133,892 B2 | |
| APPLICATION NO. | : 09/905678 | |
| DATED | : November 7, 2006 | |
| INVENTOR(S) | : Khan et al. | |

It is certified that error appears in the above-identified patent and that said Letters Patent is hereby corrected as shown below:

Claim 4, Col. 17, line 37, please replace "habitat provided" with --habitat is provided--.

Signed and Sealed this
Twentieth Day of September, 2011

David J. Kappos
*Director of the United States Patent and Trademark Office*